May 29, 1934.  J. W. HARDING  1,960,583
METHOD OF MAKING MOLDS
Filed May 31, 1933  2 Sheets-Sheet 1
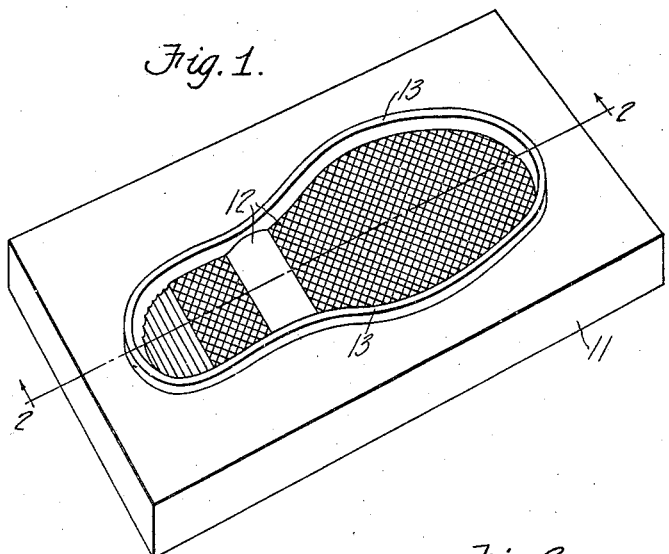
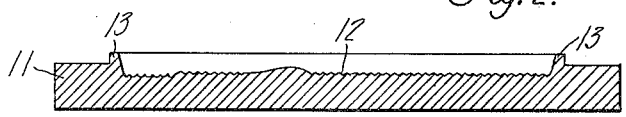
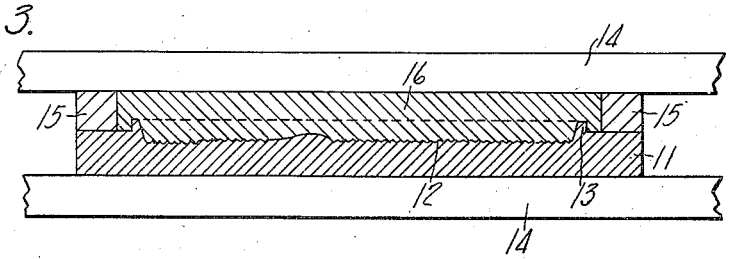
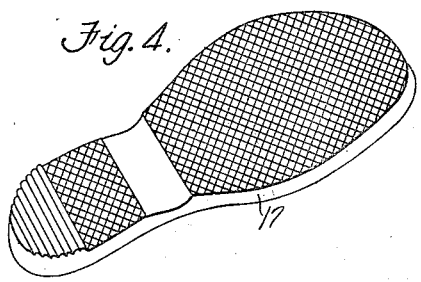
INVENTOR.
Justus W. Harding.
BY
ATTORNEY.

May 29, 1934.　　　　J. W. HARDING　　　　1,960,583
METHOD OF MAKING MOLDS
Filed May 31, 1933　　　　2 Sheets-Sheet 2
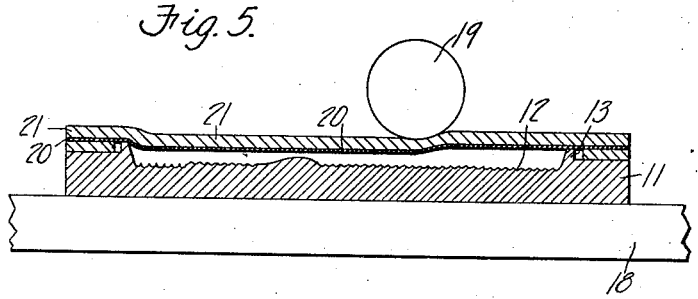
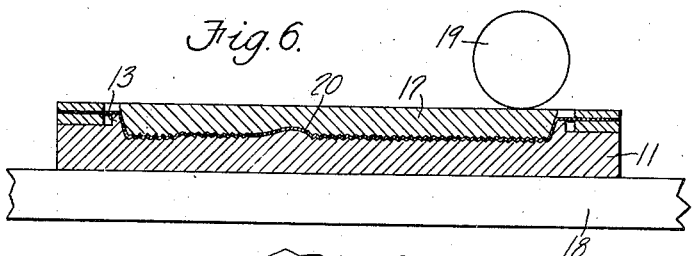
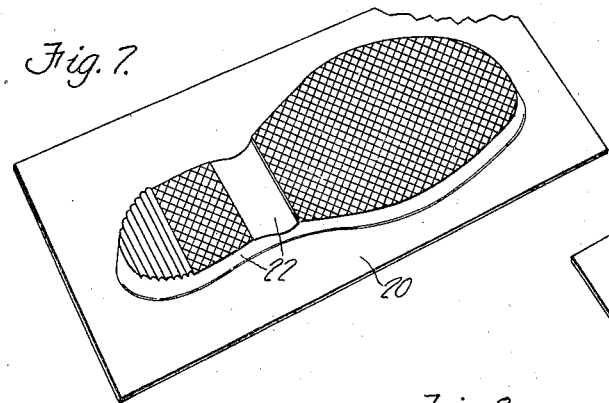
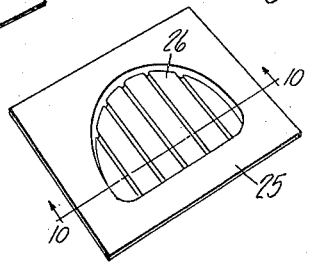
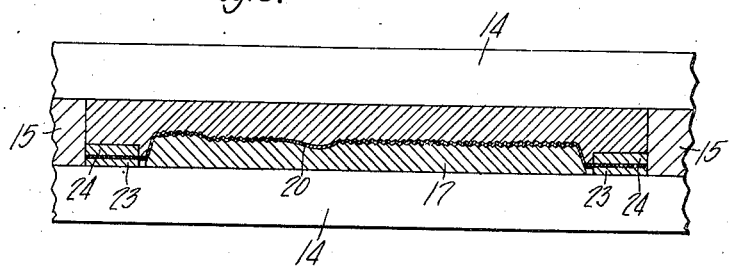
INVENTOR.
Justus W. Harding.
BY
ATTORNEY.

Patented May 29, 1934

1,960,583

UNITED STATES PATENT OFFICE 1,960,583

METHOD OF MAKING MOLDS

Justus W. Harding, South Bend, Ind., assignor to The South Bend Tribune, South Bend, Ind., a corporation of Indiana Application May 31, 1933, Serial No. 673,665

11 Claims. (Cl. 22—190)

The invention relates to methods and means of making molds, and particularly molds used in forming rubber goods and the like which require the application of only a comparatively low heat to form the same to the shape of the mold.

In present production methods in the formation of rubber and like articles, molding machines are employed of a character requiring a large number of molds, which molds are movably mounted in the machine whereby they may be steadily and consecutively fed with the material to be molded, and, after being fed, move through the machine, with the molding process being carried on, to a discharge point, where the finished molded product is removed from the mold and from which the molds travel to the feeding station. It will be seen that, in machines operating continuously in this manner, a large number of molds are required, and that the expense of such molds or dies, if they are diesunk and formed of brass or the like, is quite large. Furthermore, it will be seen that, should styles of the molded rubber pieces, such as those used in rubber footwear, change, a considerable period of time is required in which to have new molds or dies prepared, if this is done by conventional diesinking methods.

It is therefore the primary object of this invention to provide a method and means of forming molds for articles of this character by which the molds may be inexpensively and quickly formed in large quantities.

A further object is to provide a method of forming molds of this character by which the molds may be cast.

A further object is to provide a method by which a mold having an intaglio impression of varying depth may be readily cast with the use of a papier mâché matrix.

A further object is to provide a method of this character for forming a mold from a papier mâché matrix which includes the reinforcing of the matrix in a manner to retain the impression thereof while subjected to the heavy weight of the molten metal from which the mold is formed.

A further object is to provide means by which a mold may be cast from a papier mâché matrix.

With the above and other objects in view, the invention resides in the steps of the method and in the construction and arrangement of the means by which the method is carried out, as hereinafter set forth, shown in the drawings, described and claimed, it being understood that changes may be made in the precise steps of the method and construction of the means within the scope of what is claimed, without departing from the spirit of the invention.

In the drawings:

Figure 1 is a perspective view of the master mold which is to be reproduced.

Figure 2 is a longitudinal vertical sectional view of the mold taken on line 2—2 of Figure 1.

Figure 3 is a longitudinal vertical sectional view taken on line 2—2 of Figure 1 and illustrating the manner of producing a die complementary to the desired mold.

Figure 4 is a perspective view of the die cast.

Figure 5 is a transverse sectional view illustrating the first step in forming the matrix.

Figure 6 is a view illustrating the conjoint use of the master mold and die cast to form the matrix.

Figure 7 is a perspective view of the completed matrix.

Figure 8 is a longitudinal vertical sectional view illustrating the conjoint use of the matrix and die cast in the casting of the mold.

Figure 9 is a perspective view of a different type of matrix.

Figure 10 is a sectional view of the modified matrix.

In the drawings the method has been illustrated as applied to the manufacture of molds for the rubber soles of shoes. Numeral 11 designates the mold desired to be reproduced, which may be called the master mold. This mold is preferably formed of brass, aluminum, or other metal having a melting point much higher than that of conventional stereotype metal, or other metals having a low melting point, which melting point, however, is considerably above the temperature required to mold rubber or the like. The mold 11 has formed therein, by conventional die sinking methods, the desired intaglio die impression 12, which is preferably bounded by a lip 13 which projects above the surface of the mold 11 and adds depth to impression 12. It will be seen from Figure 2, that, in a mold as illustrated for the purpose of forming a rubber shoe sole, the depth of the intaglio impression 12 of the mold varies throughout the extent thereof.

In the first step of the process the brass master mold 11 is disposed in a suitable casting form of the type conventionally employed in working stereotype metal and which comprises spaced plates 14, and bars 15 are positioned between said mold and the opposed plate 14. Stereotype metal is then poured into the casting form between mold 11, opposed plate 14 and within the area of the confining bars 15, in the manner illustrated in Figure 3, to form a member 16 having an impression complementary to the impression 12 of mold 11. To insure the production of a faithful complementary impression of mold 11 on member 16, the mold 11 may be floated in the vessel or other container in which the stereotype metal of which member 16 is formed to preheat the same preparatory to the application of the stereotype metal thereto in the casting form. After the member 16 is removed from mold 11, it is routed and cut to the shape of mold impression 12 and to a thickness only slightly greater than the depth of said impression 12 to form a die cast 17, as illustrated in Figure 4. The die cast 17 thus formed bears, in relief, an impression complementary to the intaglio impression 12, with its plane surface projecting only slightly above the upper faces of the lips 13 defining impression 12 of mold 11.

The mold 11 is then placed on a suitable matrix forming machine comprising a base plate 18 and a pressure roller 19, which are movable one relative to the other, and a piece of papier-mâché 20 is disposed on the mold. Over the papier-mâché is disposed a felt sheet 21, or a sheet of equally compressible and yielding material. These elements, so positioned, are then run under the pressure roller 19 of the matrix forming machine, and the pressure applied thereto outlines the impression desired to be produced on the matrix 20. The felt sheet 21 is then removed, and the die cast 17 is placed on the matrix, the outlining of the desired impression on matrix 20 forming a guide to the correct positioning of the die cast on the matrix so that it will exactly register with the impression 12 of mold 11. So positioned, the mold, matrix and die cast are run through the matrix forming machine, and the pressure applied thereby upon die cast 17 forces the matrix entirely into the impression 12 of mold 11 to form an off-set impression 22 therein of the same depth as impression 12 and whose opposite faces carry the impressions of the mold 11 and die cast 17. It has been found that dry papier-mâché is preferable for the matrix 20, due to the liability of wet papier-mâché to tear when applied between the mold 11 and die cast 17. All dry papier-mâché has some contained moisture, however, which, upon drying after the matrix has been formed, results in shrinking of the matrix, and for this reason the matrix 20 is placed, immediately after being formed, in a drying device, (not shown) such as a conventional steam table employing a draft of compressed air to facilitate drying. In this way the matrix is cured and retains the exact shape to which it has been pressed. It will also be noted that the inner face of lip 13 defining impression 12 of mold 11 and the peripheral edge of die cast 17 extend at an angle to the axial horizontal plane of said mold and die cast, so that the die cast 17 may fit into impression 12 of mold 11 without producing a shearing action on the matrix 20 when the latter is disposed therebetween, and at the same time permit exact reproductions to be made on the opposite faces of said matrix of their respective impressions without regard to the fact that they are spaced apart a distance equal to the thickness of the matrix.

Having thus formed a die cast 17 and matrix 20 from master mold 11, said die cast and matrix are applied to the casting form with the die cast 17 fitting into the convex or recessed side of the matrix 20, and the edges of the matrix outwardly of the impression 22 therein being supported by suitable spacers 23 resting upon one plate 14 of the casting form, and in turn supporting forming bars 24 by which the forming of the material to be cast is facilitated. Bars 15 are disposed between the plates 14 of the casting form to properly space said plates and to outline the shape of the mold to be cast. Stereotype or other suitable metal having a comparatively low melting point is then poured in the casting form, which sets in desired shape with an intaglio impression in exact reproduction of the impression 12 of mold 11. It will be seen that exactness in reproduction of the impression 12 of mold 11 is insured by the fact that impression 22 of matrix 20 is solidly backed and supported at all points thereof by die cast 17, so that it is enabled to firmly support, without distortion, the heavy weight of the stereotype metal being cast. Furthermore, it will be evident that any number of these stereotype metal molds in exact reproduction of mold 11 may be made from one matrix and die cast; that the whole process of making die cast, matrix and the required number of molds requires only a fraction of the time required to die sink one brass mold; and that, consequently, the cost of producing molds by this method is but a fraction of the cost of die sinking the same number of brass molds. These stereotype metal molds have, in actual practice, been found to be as practical and acceptable in molding rubber and like articles as the conventional brass molds, due to the fact that their melting point is about 450 degrees Fahrenheit, while the molding temperature of rubber is only about 250 degrees Fahrenheit, and they have the obvious additional advantage of being as easily reworked as they are easily originally made.

The method described above has particular application to the forming of molds having intaglio impressions of considerable depth, that is, a depth considerably greater than that which it has heretofore been possible to obtain in casting a mold from a papier-mâché matrix. A further application of this method, by which molds having an impression of greater depth than conventional matrix impressions may produce, yet less than the depth hereinbefore illustrated and described, may be formed, is illustrated in part in Figures 9 and 10. These figures illustrate a matrix 25 having an off-set impression 26 formed therein, which impression is complementary on its convex face to the impression of the master mold to be reproduced. To the concave face of this matrix is adhesively secured a plurality of cardboard members 27, of a thickness equal to the depth of the matrix impression 26. These cardboard members are closely spaced and correctly positioned to effectively support the matrix impression, so that, when placed in a casting form and having stereotype metal applied thereto, the matrix will sustain the weight of the metal without distortion, and thus faithfully reproduce, in intaglio, the relief impression thereof.

It will thus be seen that both of these example methods permit the reproduction of a master mold having an impression of a depth greater than that for the reproduction of which papier-mâché matrices have been heretofore practical, by the use of a papier-mâché matrix suitably backed or supported to enable it to maintain its deep impression while a heavy mold is cast therefrom in faithful reproduction of its impression.

The invention having been set forth, what is claimed as new and useful is:

1. The method of reproducing a master mold having a deep intaglio impression comprising forming a casting having a relief impression complementary to said mold impression, cutting said casting to a thickness substantially equal to the depth of said intaglio impression, placing a papier-mâché matrix covered with a sheet of yielding material on said mold, applying pressure to said yielding material and matrix to outline the shape of said mold impression, removing said yielding material and positioning said casting on said matrix in registration with said mold, applying pressure to said casting to form an off-set impression in said matrix complementary to said mold impression, heating said matrix to thoroughly dry it without shrinking, fitting said matrix over said casting in registering relation thereto, and casting a mold on said matrix.

2. The method of reproducing a master mold comprising forming a casting complementary to said mold, placing a papier-mâché matrix covered with a sheet of yielding material on said mold, and applying pressure thereto to outline said mold on said matrix, removing said yielding material and placing said casting on said matrix in registering relation to said mold, applying pressure to said casting to impart the impression of said mold to said matrix, heating said matrix to thoroughly dry it without shrinking, placing said casting in registering relation beneath said matrix, and casting a mold on said matrix.

3. The method of reproducing a master mold having a deep intaglio impression comprising forming a casting having a relief impression complementary to said mold impression, cutting said casting to a thickness substantially equal to the depth of said intaglio impression, placing a papier-mâché matrix covered with a sheet of yielding material on said mold, applying pressure to said yielding material and matrix to outline the shape of said mold impression, removing said yielding material and positioning said casting on said matrix in registration with said mold, applying pressure to said casting to form an off-set impression in said matrix complementary to said mold impression, fitting said matrix over said casting in registering relation thereto, and casting a mold on said matrix.

4. The method of reproducing a master mold having a deep intaglio impression comprising forming a casting having a relief impression complementary to said mold impression, cutting said casting to a thickness substantially equal to the depth of said intaglio impression, interposing a papier-mâché matrix between said mold and casting, applying pressure to said casting to form an off-set impression in said matrix complementary to said mold impression, heating said matrix to thoroughly dry it without shrinking, fitting said matrix over said casting in registering relation thereto, and casting a mold on said matrix.

5. The method of reproducing a master mold having a deep intaglio impression comprising forming a casting having a relief impression complementary to said mold impression, cutting said casting to a thickness substantially equal to the depth of said intaglio impression, interposing a papier-mâché matrix between said mold and casting, applying pressure to said casting to form an off-set impression in said matrix complementary to said mold impression, fitting said matrix over said casting in registering relation thereto, and casting a mold on said matrix.

6. The method of reproducing a master mold comprising forming a casting having an impression complementary to said mold impression, placing a papier-mâché matrix on said mold and applying pressure thereto to outline said mold impression, placing said casting on said matrix in registration with said mold impression and applying pressure thereto to impart an impression to said matrix complementary to said mold impression, placing said matrix in registering relation upon said casting, and casting a mold on said matrix.

7. The method of reproducing a master mold comprising forming a casting from said mold having an impression complementary to said mold impression, interposing a papier-mâché matrix between said mold and casting and applying pressure to said casting to impart an impression to said matrix complementary to said mold impression, heating said matrix to thoroughly dry it without shrinkage thereof, placing said matrix in registering relation upon said casting, and casting a mold on said matrix.

8. The method of reproducing a master mold comprising forming a casting from said mold having an impression complementary to said mold impression, interposing a papier-mâché matrix between said mold and casting and applying pressure to said casting to impart an impression to said matrix complementary to said mold impression, placing said matrix in registering relation upon said casting, and casting a mold on said matrix.

9. The method of reproducing a master mold comprising forming a casting having an impression complementary to said mold impression of a metal having a lower melting point than said master mold, interposing a papier-mâché matrix between said mold and casting and applying pressure to said casting to impart an impression to said matrix complementary to said mold impression, placing said matrix in registering relation on said casting, and casting a mold on said matrix of a metal similar to said casting.

10. The method of reproducing a master mold comprising forming a casting directly against the surface of said mold, interposing and subjecting to pressure between said mold and casting a sheet of deformable material to form a matrix having an impression complementary to said mold impression, placing said matrix in registering relation upon said casting, and casting a mold on said matrix.

11. The method of reproducing a master mold comprising the successive steps of forming a casting having an impression complementary to said mold impression, interposing and subjecting to pressure between said mold and casting a sheet of deformable material to form a matrix having an impression complementary to said mold impression, placing said matrix in registering relation upon said casting, and casting a mold on said matrix.

JUSTUS W. HARDING.